Nov. 26, 1957  R. M. WELLS  2,814,168
DEBURRING MACHINE FOR GEARS AND THE LIKE
Filed May 22, 1956  3 Sheets-Sheet 1

Inventor
Robert M. Wells
Paul O. Pippel
Attorney

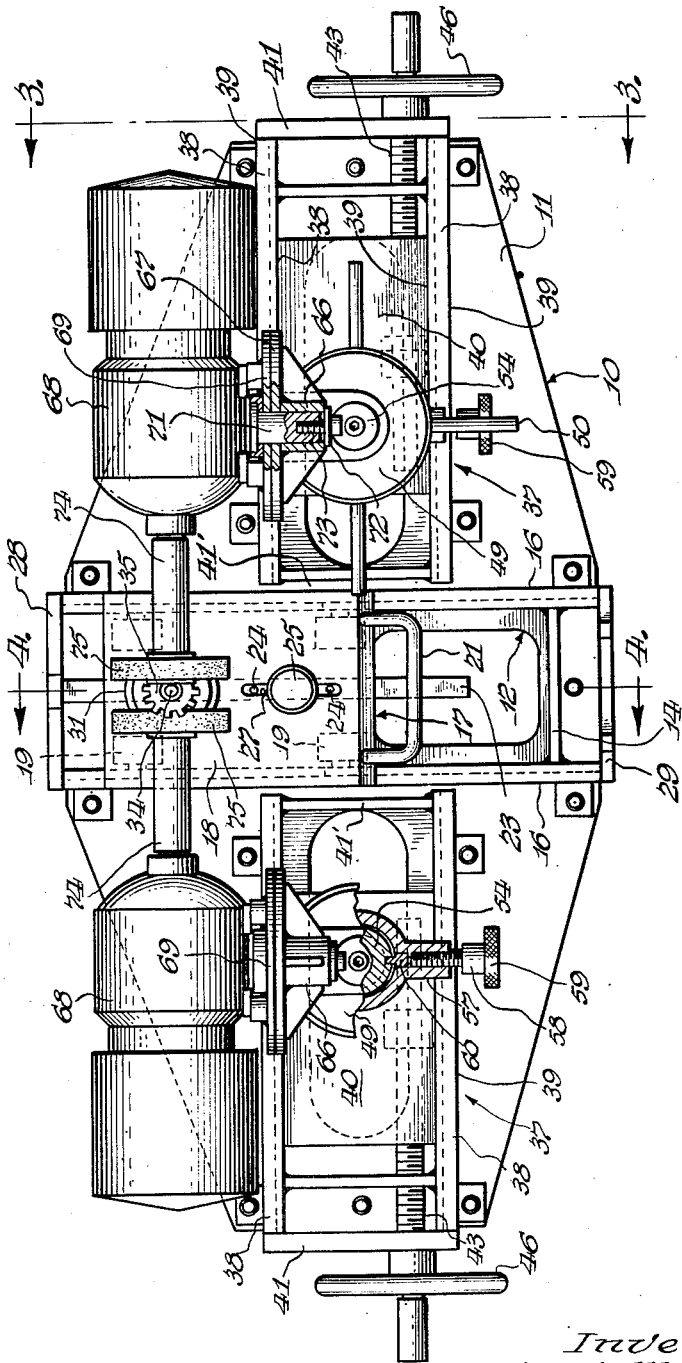

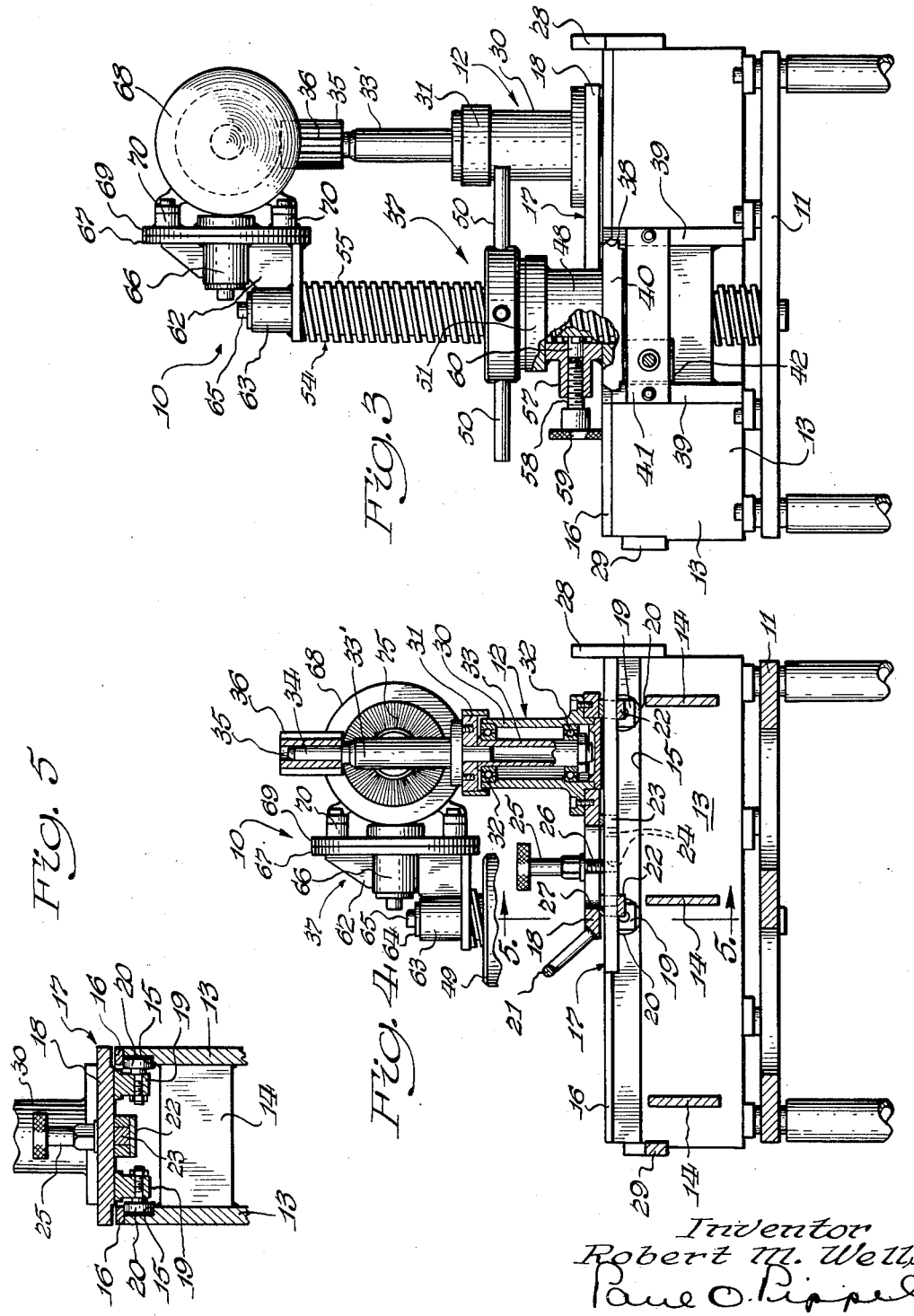

United States Patent Office 2,814,168
Patented Nov. 26, 1957

2,814,168
DEBURRING MACHINE FOR GEARS AND THE LIKE

Robert M. Wells, Whitefish Bay, Wis., assignor to International Harvester Company, a corporation of New Jersey Application May 22, 1956, Serial No. 586,546

5 Claims. (Cl. 51—89)

This invention relates to an improvement in deburring machines. More specifically, the invention relates to a device for deburring cylindrically shaped objects such as gears and the like.

The prime object of the present invention is to provide an improved deburring machine particularly adapted to debur cylindrical articles in an efficient production manner.

A more specific object is to provide a deburring device for deburring cylindrical objects such as gears, the deburring device including a plurality of deburring heads adapted to be universally adjusted for deburring objects having various contours.

A still further object is the provision of an improved deburring device having a plurality of adjustments whereby a deburring head may be adjusted universally to many positions for effectively accomplishing a deburring operation.

Still another object is to provide an improved deburring fixture having a work loading arrangement adapted to quickly place objects to be deburred in a deburring position with respect to the universally adjustable heads of a deburring machine.

A further and more specific object is the provision of a deburring machine for deburring gears and the like, the machine having a quick work loading arrangement and including a plurality of deburring heads adapted to be universally adjusted so that the deburring machine may accommodate a variety of gears of different shapes and contours.

These and further objects will become more readily apparetn from a reading of the description when examined in connection with the accompanying sheets of drawings.

In the drawings:

Figure 1 is a front elevational view, with certain portions broken away to show sections of a deburring machine for deburring gears and the like;

Figure 2 is a plan view of the deburring machine shown in Figure 1;

Figure 3 is a side elevational view with certain portions shown in section, the said view being taken particularly along the line 3—3 of Figure 2;

Figure 4 is a cross sectional view through a deburring machine, the said view being taken substantially along the line 4—4 of Figure 2, and Figure 5 is a detail sectional view of a portion of a deburring machine taken substantially along the line 5—5 of Figure 4.

Figure 1:
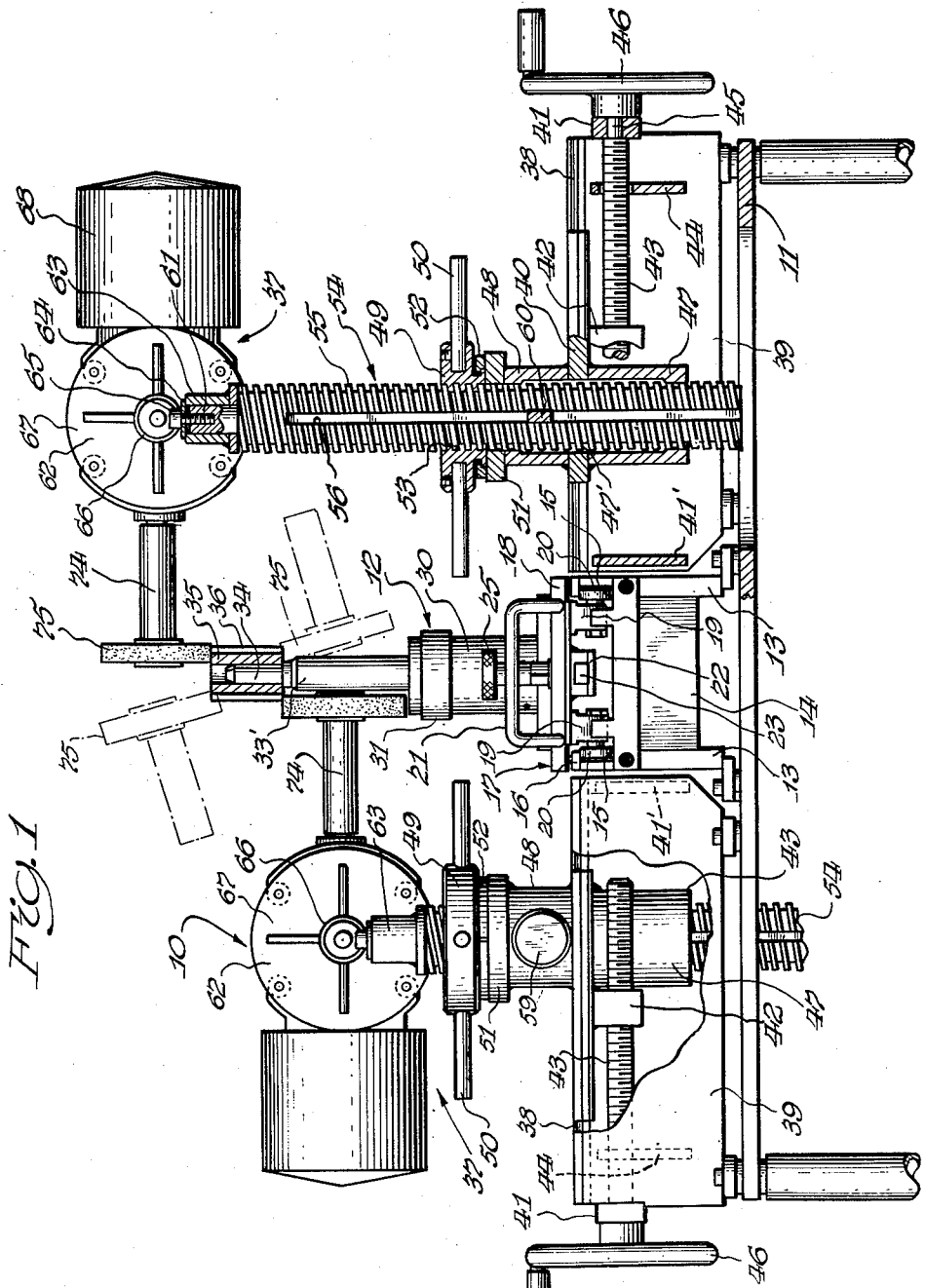

A deburring machine shown in Figures 1 through 4 is generally designated by the reference character 10. The machine 10 comprises a base 11 on which is positioned a work support generally designated by the reference character 12. The work support 12 comprises vertical side walls 13 suitably connected to the base 11. The side walls 13 are interconnected by means of transversely extending gussets 14. Each vertical side wall 13 is suitably recessed at its upper portion to provide a pair of tracks 15 extending transversely with respect to the base 11. Transversely extending retaining strips 16 are connected to the upper portions of the side walls 13 and are coextensive with the said tracks 15. A wheeled carriage is generally designated at 17.

The wheeled carriage 17 comprises a frame 18 having depending from a lower surface thereof a plurality of wheel supports 19. Each wheel support 19 has journalled thereon a wheel 20, the said wheels 20 being retained on, and in rolling engagement with respect to the tracks 15. A handle 21 is connected to the wheel carriage 17. A plurality of hanger brackets 22 project downwardly from the underneath surface of the frame 18. The hanger brackets 22 slidably support the stop rod 23. The stop rod 23, as best shown in Figures 2 and 4 is provided with a plurality of vertically extending and longitudinally space tapped openings 24.

A lock knob 25 projects upwardly from the wheel carriage 17, the said knob 25 having a threaded extension 26 which projects through a slot 27 in the frame 18. The threaded extension 26 is adapted to be threaded into each of the tapped openings 24. A transversely extending stop plate 28 is suitably connected to the side walls 13 at one end of the tracks 15. A wheel stop plate 29 is positioned at the opposite end of the tracks 15.

A tubular pedestal 30 projects upwardly from the frame 18 as best shown in Figure 4. The tubular pedestal 30 is provided at its upper end with a rotatable platform member 31. Upper and lower bearings 32 are suitably supported in the tubular pedestal 30, the said bearings having journalled thereon a spindle 33 which is rigidly connected to the rotatable member 31. The spindle 33 is suitably conected to the bearings 32 for rotating movement thereon, the said spindle 33 being suitably retained on the tubular member 30 against vertical displacement. Another spindle or standard 33' extends upwardly from the platform 31. The spindle 33' is suitably and rigidly connected to the said platform 31 for rotation therewith and includes at its upper end a cylindrical work holding element 34. As best shown in Figures 1, 2 and 4 the work holding element 34 is adapted to receive and support a gear 35 having a plurality of outer teeth 36.

The base 11 suitably supports on opposite sides of the wheeled carriage 17 a pair of deburring fixtures generally designated at 37. The deburring fixtures are identical in construction and in their association with respect to the base 11 so that the same reference characters will apply.

Each deburring fixture 37 is suitably supported on track slides 38 formed at the upper portions of transversely spaced vertical walls 39. The vertical walls 39 extend in substantially perpendicular or 90° angular relation with respect to the walls 13. A slide frame or plate 40 is suitably connected to the track slides 38 for relative reciprocating movement, the said plate 40 being suitably retained on said slides 38 against vertical displacement. The walls 39 are connected at one end by means of a stop 41. The other ends of the walls 39 are also suitably connected by means of a stop 41' best shown in Figures 1 and 2. As best shown in Figure 1, a screw block 42 is rigidly secured to the underneath side of the slide frame 40. A lead screw 43 is suitably threaded through the block 42 the said lead screw extending through a gusset 44 extending transversely and connecting the walls 39. The lead screw 43 is provided with a reduced journal portion 45 extending through the stop 41'. A hand wheel 46 is rigidly connected to the extension 45 for rotating the lead screw 43 whereupon reciprocating movement in a horizontal direction is achieved by means of the connection of the lead screw 43 to the screw block 42. Thus the frame 40 may be adjusted horizontally with respect to the track slides 38.

As best indicated in Figure 1, a cylindrical guide 47 is connected to and projects downwardly with respect to the frame 40. The frame 40 is provided with an opening 47' registering with an upper tubular guide 48 which is suitably connected to the frame 40. An annular threaded collar 49 includes a plurality of circumferentially disposed rods 50, the said collar 49 being suitably supported for rotation on an annular plate 51 rigidly secured to the upper guide 48. A retainer ring 52 suitably connects the collar 49 to the plate 51 to permit relative rotation but to secure the same against vertical displacement. The collar 49 is threaded as indicated at 53 and receives an upright screw 54 having suitable threads 55 engaging the threads of the collar 49. It is apparent that upon rotation of the collar 49 the screw 54 may be raised and lowered with respect to the frame 40. The upright screw 54 is also provided with a vertically extending slot 56.

Referring now particularly to Figures 2 and 3 a boss 57 extends outwardly from each of the upper cylindrical guides 47. Each boss 57 is threaded to rotatably support a screw 58 having at one end a knob 59. The other end of each screw 58 is provided with a pawl 60 which is adapted to slidably engage the vertical slots 56 of each of the screws 54. Thus the screws 56 are mounted for relative vertical movement with respect to the frame 40 and are held against rotation by means of the pawl 60. Thus upon rotation of the threaded collar 49 vertical movement of the screw 58 is accomplished.

Each screw 54 is provided at its upper end with an attached upright journal member 61. As best shown in Figure 1 the journal member 61 is associated with a bracket 62 by means of a collar 63 integral with the said bracket 62. The collar 63 mates with the journal member 61 so that the said collar 63 may be pivoted. The collar 63 may be secured to the screw 54 against relative movement by means of a retainer plate 64 which is adapted to be rigidly secured against the collar 63 by means of a set screw 65 threaded into the upper end portion of the journal member 61. A horizontally extending collar 66 is also integrally formed with the bracket 62. As best shown in Figure 2, the collar 66 is also integral with a flat circular mounting plate 67, which is adapted to be associated with an electric motor 68. Each electric motor 68 is also provided with a circular mounting plate 69 suitably connected to the motor 68 by means of brackets 70. A shaft 71 projects outwardly from the plate 69, the said shaft 71 suitably providing journal means in view of its mating relation with respect to the collar 66. The shaft 71 may thus rotate about a horizontal axis with respect to the collar 66 but may be normally maintained against such rotation by means of a retainer plate 72 which engages the collar 66 and is securely held with respect thereto by means of a set screw 73 threaded into the end portion of the shaft 71.

The motor 68 is also provided with a suitable spindle 74 adapted to be rotated by the said motor 68, the spindle 74 having connected thereto at one end thereof, for rotation therewith, a deburring wheel 75. The deburring wheel 75 may be of any conventional construction suitable for deburring objects. Such wheels may generally be termed as burnishing, polishing, deburring, or grinding wheels.

The operation

The deburring machine is particularly adapted for the deburring of gears and the like. Of course, the arrangement disclosed can also be adapted for performing numerous material removing operations on such items as sleeves, collars, bearing races, and other types of cylindrical objects which require operations of a type similar to deburring. The machine is particularly adapted for high speed production operations and initially the operator moves the carriage 17 to the forward end of the tracks 15. He thereupon loads a gear onto the work holding element 34. He thereupon moves the carriage rearwardly on the tracks 15, the said carriage being in proper position when one end of the stop rod 23 engages the stop plate 28 as indicated. It is apparent that the stop rod 23 may be adjusted longitudinally relative to the wheel carriage 17. This of course is effected by simply rotating the lock knob 25 to loosen the rod with respect to the carriage 18 whereupon the rod may be moved longitudinally, the threaded extension 26 being movable in the slot 27. Upon subsequent tightening of the lock knob 25 the rod is again tightened or locked in position relative to the frame 18 and will serve its function as a stop for the wheel carriage 17 when it engages the stop plate 28. Thus it is apparent that the wheel carriage and the spindle 33' may be positioned in a number of horizontal positions relative to the deburring wheels 75.

Assuming now that the stop rod is adjusted to its desired position, the spindle 33' and the gear 36 mounted thereon is positioned in certain relation with respect to the deburring wheels 75. It is now the intention of the operator to set the wheels 75 in the desired position, a variety of such positions being shown in the full and phantom lines shown in Figure 1 wherein the deburring wheels 75 are positioned in working relation with respect to the article to be deburred.

Thus since the operator wishes to make a setup which will be maintained in position for deburring a number of similar gears he thereupon actuates each of the hand wheels 46 to position the screw 54 in a certain position relative to the work to be operated upon. Thus horizontal positioning of the frame 40 is accomplished. He now desires to raise the screw 54 to the proper position so that the same is at the height desired. This is accomplished by merely rotating the threaded collar 49 whereupon vertical movement of the screw 54 in an upward or downward direction takes place. When the proper height has been achieved it is now desired to angularly position the deburring wheel 75 relative to the work to be operated upon. It is readily apparent that the motor 68 and its associated structure comprising the spindle 74 and wheel 75 may be swung about a vertical axis and may also be rotated about a horizontal axis by virtue of the novel arrangement of the collars 63 and 66 in their relation to the shafts or journal members 61 and 71 respectively. By merely loosening the set screws 65 and 73 such desired swinging movement may be obtained until the deburring wheels 75 are in the desired angular position shown relative to the work to be operated upon. Then upon tightening of the set screws 65 and 73 the deburring fixtures are rigidly held in the desired position. Rotation of the screw 54 is of course prevented by means of the pawl 60 which is slidable within the slot 56 of each screw 54.

The deburring machine 10 is now ready for operation and upon actuation of the electric motor 68 the object is deburred at the desired points. During the deburring, the gear is rotated by means of the spindle 33' which is rotatably supported to rotate with the platform 31 in the bearings 32. Thus all circumferential points of the gear and particularly the teeth portion 66 are deburred. After the deburring operation the operator merely retracts the wheel carriage 17 and unloads the deburred gear and places another gear on the work holding element 34 whereupon he then again pushes the wheel carriage 17 toward the stop 28 and in position for another deburring operation. Thus in each instance the carriage is returned to its original setup position and proper relationship with respect to the deburring fixtures which are now held in the production position. Quick loading and unloading of the carriage is thus achieved and in each instance the gear to be operated upon is identically positioned for engagement by the deburring wheels 75.

Thus it can be seen that a novel and high production deburring machine has been described and disclosed. Universal adjustment of the deburring wheel 75 is possible by virtue of the various adjustable elements which have been described. The objects have been fully achieved. It must be realized, however, that further structural changes and modifications may be made which are completely encompassed within the spirit of the present invention and within the scope of the appended claims.

What is claimed is:

1. A deburring machine comprising a base, a work support carried on said base, said work support including a first track carried on said base, and extending transversely with respect thereto, stops disposed on opposite ends of said track, a wheeled carriage movably supported on said first track, a stop rod slidably supported on said carriage and adapted to project outwardly therefrom for engaging one of said stops, means on said carriage for moving said stop rod to a number of positions, a spindle rotatably supported on said carriage and extending vertically with respect thereto, said spindle having a work holder adapted to rotatably support a work piece, deburring fixtures disposed on opposite sides of said carriage, said fixtures each including a second track on said base extending substantially perpendicular with respect to said first track, a support supported on each second track for reciprocation with respect to said spindle, pedestal means connected to each support and adapted to be vertically adjusted with respect thereto, an upright bearing member at the upper end of each pedestal, a bracket connected to said bearing member and adapted to be adjusted about a vertical axis, said bracket having a horizontally extending bore, a motor on each fixture, a shaft rigidly connected to each motor, each said shaft extending into each respective bore, means connecting each shaft to each bracket for adjustment to a number of positions about a horizontal axis whereby each motor may be angularly adjusted, and rotary work engaging means on each motor and rotated thereby for engaging work mounted on the spindle and for rotating the same.

2. A deburring machine comprising a base, a work support carried on said base, said work support including a first track carried on said base and extending transversely with respect thereto, stops disposed at opposite ends of said track, a wheeled carriage movably supported on said first track, a stop rod slidably supported on said carriage and adapted to project outwardly therefrom for engaging one of said stops, means on said carriage for moving said stop rod to a number of positions, a spindle rotatably supported on said carriage and extending vertically with respect thereto, said spindle having a work holder adapted to rotatably support a work piece, deburring fixtures disposed on opposite sides of said carriage, said fixtures each including a second track on said base extending in a direction substantially at a right angle with respect to said first track, a support supported on each second track for reciprocation with respect to said spindle, means connected to each support for reciprocating the same, a pedestal member connected to each support and adapted to be vertically adjusted with respect thereto, an upright bearing member at the upper end of each pedestal, a bracket connected to said bearing member and adapted to be adjusted about a vertical axis, said bracket having a horizontally extending bore, a motor on each fixture, a shaft rigidly connected to each motor, each said shaft extending into each respective bore, means connecting each shaft to each bracket for adjustment to a number of positions about a horizontal axis whereby each motor may be angularly adjusted, and rotary work engaging means on each motor and rotated thereby for engaging work mounted on the spindle and for rotating the same and said spindle.

3. A deburring machine comprising a base, a work support carried on said base, said work support including a first track carried on said base and extending transversely with respect thereto, stops disposed on opposite ends of said track, a carriage movably supported on said first track, a stop rod slidably supported on said carriage and adapted to project outwardly therefrom for engaging one of said stops, means on said carriage for moving said stop rod to a number of positions, a spindle rotatably supported on said carriage and extending vertically with respect thereto, said spindle having a work holder adapted to rotatably support a work piece, deburring fixtures disposed on opposite sides of said carriage, said fixtures each including a second track on said base extending angularly with respect to said first track, a support supported on each second track for reciprocation with respect to said spindle, means connected to each support for reciprocating the same, a pedestal member connected to each support and adapted to be vertically adjusted with respect thereto, an upright bearing member at the upper end of each pedestal, a bracket connected to said bearing member and adapted to be adjusted about a vertical axis, said bracket having a horizontally extending bore, a motor on each fixture, a shaft rigidly connected to each motor, each said shaft extending into each respective bore, means connecting each shaft to each bracket for adjustment to a number of positions about a horizontal axis whereby each motor may be angularly adjusted, and rotary work engaging means on each motor and rotated thereby for engaging work mounted on the spindle and for rotating the same and said spindle.

4. A deburring machine comprising a base, a work support carried on said base, said work support including a first track carried on said base and extending transversely with respect thereto, a wheeled carriage movably supported on said first track, a spindle rotatably supported on said carriage and extending vertically with respect thereto, said spindle having a work holder adapted to rotatably support a work piece, deburring fixtures disposed on opposite sides of said carriage, said fixtures each including a second track on said base extending angularly with respect to said first track, a support supported on each second track for reciprocation with respect to said spindle, means connected to each support for reciprocating the same, a pedestal member connected to each support and adapted to be vertically adjusted with respect thereto, an upright bearing member at the upper end of each pedestal, a bracket connected to said bearing member and adapted to be adjusted about a vertical axis, said bracket having a horizontally extending bore, a motor on each fixture, a shaft rigidly connected to each motor, each said shaft extending into each respective bore, means connecting each shaft to each bracket for adjustment to a number of positions about a horizontal axis whereby each motor may be angularly adjusted, and rotary work engaging means on each motor and rotated thereby for engaging work mounted on the spindle and for rotating the same and said spindle.

5. A deburring machine comprising a base, a work support carried on said base, said work support including a first track supported on said base, a carriage movably supported on said first track, a spindle supported on said carriage and extending vertically with respect thereto, said spindle having a work holder adapted to rotatably support a work piece, deburring fixtures disposed on opposite sides of said carriage, said fixtures each including a second track on said base extending angularly with respect to said first track, a support supported on each second track for reciprocation with respect to said spindle, means connected to each support for reciprocating the same, a pedestal member connected to each support and adapted to be vertically adjusted with respect thereto, an upright bearing member at the upper end of each pedestal, a first bracket connected to said bearing member and adapted to be adjusted about a vertical axis, a motor on each fixture, a second bracket on each said motor, means connecting each second bracket to each first bracket for adjustment to a number of positions about a horizontal axis whereby each motor may be angularly adjusted, and rotary work engaging means on each motor and rotated thereby for engaging work mounted on the spindle and for rotating the same and said spindle.

References Cited in the file of this patent
UNITED STATES PATENTS

| | | |
|---|---|---|
| 610,036 | Ensign | Aug. 30, 1898 |
| 2,345,986 | Mentley et al. | Apr. 4, 1944 |

FOREIGN PATENTS

| | | |
|---|---|---|
| 297,963 | Great Britain | Oct. 4, 1928 |